Nov. 26, 1935.  W. R. HAINSWORTH  2,021,994

REFRIGERATING APPARATUS

Filed Jan. 29, 1930

William R. Hainsworth
INVENTOR

BY
Spencer, Hardman & Fish ATTORNEYS

Patented Nov. 26, 1935

2,021,994

UNITED STATES PATENT OFFICE 2,021,994

REFRIGERATING APPARATUS

William R. Hainsworth, Larchmont, N. Y., assignor, by mesne assignments, to General Motors Corporation, a corporation of Delaware Application January 29, 1930, Serial No. 424,328

3 Claims. (Cl. 62—5.2)

This invention relates to refrigerating apparatus and more particularly to refrigerating apparatus of the absorption type.

For one of its objects this invention contemplates a unitary absorption refrigerating apparatus having substantially no moving parts and capable of producing continuous refrigeration over extended periods of time.

A further object of this invention is to provide a plurality of intermittently operating refrigerating devices, and improved means whereby said refrigerating devices are cyclically operated in rotation to produce continuous refrigeration.

A still further object of this invention is to provide a plurality of intermittently operated generator-absorbers and improved heating and cooling circuits for said generator-absorbers, said circuits embodying means whereby the generator-absorbers may be cyclically operated in rotation to produce refrigeration.

Further objects and advantages of the present invention will be apparent from the following description, reference being had to the accompanying drawing, wherein a preferred form of the present invention is clearly shown.

Figure 1:
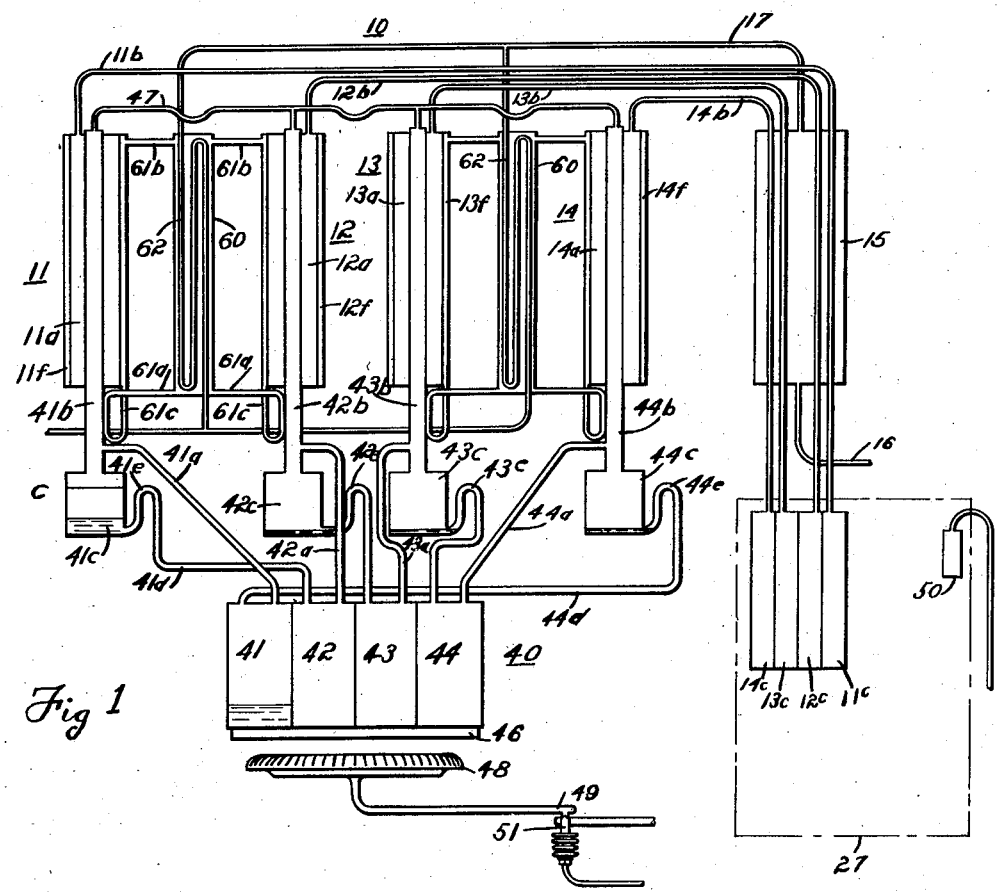
Fig. 1 is a diagrammatic view of my improved refrigerating system.

To illustrate one embodiment of my invention I have disclosed a refrigerating apparatus of the absorption type indicated generally by the reference character 10 and comprising a plurality of generator-absorbers 11, 12, 13 and 14. Each generator-absorber is charged with a suitable absorption material, which material may be either a solid or a liquid capable of absorbing, adsorbing and liberating large quantities of a refrigerant gas under varying degrees of temperature. For example, a liquid absorption material may be water and the refrigerant may be ammonia. A solid absorption material may be calcium-chloride and the refrigerant may be ammonia. In this particular apparatus I prefer to use a solid absorbent, such as calcium-chloride and a refrigerant such as ammonia. This absorption material is packed within the spaces 11a, 12a, 13a and 14a of the generator-absorbers 11, 12, 13 and 14, and these spaces are connected by conduits 11b, 12b, 13b and 14b to evaporators 11c, 12c, 13c and 14c, the evaporators being located within a cabinet to be cooled, indicated at 27. Each of the conduits 11b, 12b, 13b and 14b passes through a condenser 15 through which cooling water flows, entering through the inlet 16 and leaving through the outlet 17.

As so far disclosed, the apparatus operates in the following manner. For instance, assuming the apparatus has been initially placed in operation and that the generator-absorber 11 is being heated to drive off refrigerant and at the same time the generator-absorbers 12, 13 and 14 are being cooled to cause an absorption of refrigerant gas. Cooling of the generator-absorbers 12, 13 and 14 will cause liquid refrigerant that has accumulated in evaporators 12c, 13c and 14c to evaporate and the vapors thereof will pass back through the conduits 12b, 13b and 14b to the generator-absorbers 12, 13 and 14 where they will be reabsorbed in the calcium-chloride. At the same time gaseous ammonia will be driven out from the generator-absorber 11 and this gaseous refrigerant passing through the condenser 15 will condense therein and collect in liquid form in the evaporator 11c.

The generator-absorbers are heated in a novel manner by means of a closed circuit containing heating fluid. This circuit comprises a plurality of containers or boilers 41, 42, 43 and 44 which are mounted upon a heat conducting plate 46 to distribute the heat evenly to all of the boilers. Each boiler communicates at its upper end through the tubes 41a, 42a, 43a and 44a with condensers 41b, 42b, 43b and 44b which condensers are in heat exchange relation with the generator-absorbers as shown. Each condenser is provided at its lower end with a container 41c to 44c for collecting the condensate from the condensers and each container is provided with a siphon tube 41d such tubes connecting the containers 41c to 44c with the next succeeding boiler. That is, the siphon tube 41d connects the container 41a with the boiler 42 while the siphon tube 42d connects the condenser 42d with the boiler 43. Each siphon tube is provided with a loop 41e to 44e determining the amount of liquid that must collect before the liquid will siphon over to the next boiler. An equalizing tube 47 connects all of the condensers at their upper ends.

In operation of this heating system, a quantity of heating fluid such as water or any other volatile liquid is placed in one of the boilers, for example, in boiler 41. The amount of liquid within boiler 41 should be just sufficient to fill the container 41a slightly above the return bend 41e for a purpose to be hereinafter described. The remaining boilers 42, 43 and 44 contain substantially no heating fluid. Heat is now applied to the plate 46 causing the liquid in the boiler 41 to vaporize. These vapors pass upwardly through the conduit 41 and, coming in contact with the condenser 41b, will condense and give up their latent heat of condensation to the absorbent material within the space 11a. The condensed liquid will drop back into container 41c and will collect therein. This action will continue until the condensed liquid has collected up to the level indicated by the line C at which time substantially all of the liquid will have been driven off from the boiler 41 in the form of vapor. When the liquid reaches the level indicated by the line C it will flow through the bend 41e and all of the liquid will be siphoned over into the boiler 42 through the conduit 41d. Thereupon the heating of generator-absorber 11 will cease and the heating of generator absorber 12 will commence. The heating of generator-absorber 12 will take place in substantially the same manner. The vapors will pass upwardly through the tubes 42a and condense in the condenser 42b, will collect in container 42c and finally will be siphoned over into the boiler 43.

In this manner the heating fluid will travel in a cycle, first heating one generator and then the other generator and the shifting of the heating fluid from one generator-absorber to the other is accomplished without the use of moving parts such as valves or the like. Further the plate 46 may be heated continuously by means of the burner 48 supplied with fuel through the conduit 49. The flow of fuel may be controlled, however, in such a manner as to produce the required amount of refrigeration, that is, to maintain the cabinet 27 within predetermined temperatures. This control may be accomplished by providing a thermostat 50 within the cabinet 27 which thermostat may control a valve 51 in the fuel supply line. As the temperature within the cabinet 27 increases the thermostat will operate the valve 51 to increase the flow of fuel to the burner while as the temperature within the cabinet 27 decreases the flow of fuel to the burner will be decreased.

Cooling means for the generator-absorbers is also provided in the form of a closed circuit containing a cooling fluid. This means comprises a reservoir 60 shown in this case as between the generator-absorbers 11 and 12. A similar reservoir 61 has been shown between the generator-absorbers 13 and 14. This second reservoir is identical in construction with the first and, therefore, but one thereof will be described. Surrounding each generator-absorber 11 and 12 is a jacket 11f and 12f each jacket being connected at its lower end to the lower end of the reservoir 60 by means of conduit 61a. Each jacket is also connected at its upper end to the upper end of the reservoir by means of the conduit 61b. A cooling coil 62 is located within the reservoir 60 and is connected at one end to the outlet of the condenser 15 by the conduit 17 and at its other end discharges to waste.

In operation of this cooling system the cooling fluid within the reservoir circulates through the jackets 11f and 12f by thermo-siphonic action, taking up heat in the jackets 11f and 12f and giving up heat in the reservoir 60.

In order to provide means for interrupting the flow of cooling fluid through either of the jackets when that particular generator-absorber is being heated, there is provided a loop 61c, a part of which contacts the condenser 41b. The purpose of this loop is to reverse the flow of cooling fluid in the circuit. During the absorption period the flow of cooling fluid will be upwardly through the jacket 11f and downwardly through the reservoir 60, that is, downwardly through the portion of the loop contacting the condenser. When heat is applied to the generator-absorber 11f, it will tend to heat the fluid within the bend 61c and consequently it will tend to cause the cooling fluid to rise within that portion of the bend contacting the condenser. By properly arranging the amount of surface in the contact with the condenser 41b, the thermo-siphonic circulation of the cooling fluid may be prevented.

Figure 2:
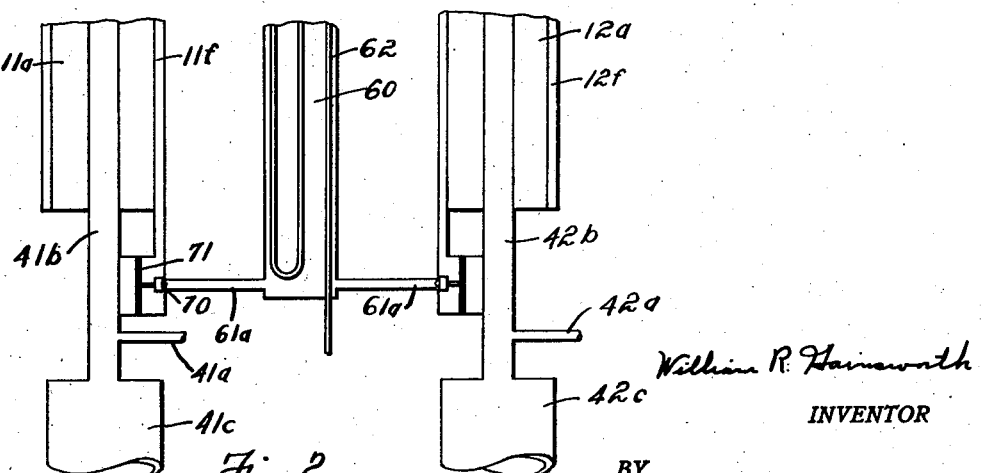
Fig. 2 is a diagrammatic view of a modified form of cooling apparatus for said refrigerating system.

A modified form of apparatus for preventing the circulation of fluid through one of the jackets, for example, through the jacket 11f when the generator-absorber 11 is being heated is disclosed in Fig. 2. This comprises a thermostatic valve 70 mounted in the connection 61a and operatively connected to the diaphragm 71 forming one wall of a chamber 72 containing an expansible fluid. The chamber 72 is secured to the wall of the condenser 41b so that the fluid within the chamber will be in heat exchange relation therewith. Consequently an increase in the temperature in the condenser 41b due to the heating of the generator 11 will cause the valve 70 to close, which a decrease in temperature due to a lack of heating, will open the valve.

In Fig. 1 each cooling system has been shown as connected to but two absorbers. In actual operation the four generator-absorbers 11 to 14 may be grouped in a circle around a single reservoir 60 and this reservoir may be provided with branch arms 61a and 61b extending to each of the four jackets. Two of these circuits have been shown merely for the purpose of clearness.

The system herein disclosed is capable of continuous refrigeration. The size of the various generator-absorbers is calculated to be such that the heating period for any one generator-absorber is one-third the length of the absorption period. In other words, the generator-absorber 11 is heated while the other three generator-absorbers are being cooled.

In operation, heat will be supplied continuously to the plate 46. This means that one of the generator-absorbers will be heated at all times. As soon as the heating of one generator-absorber is completed, the heating of the next succeeding generator-absorber will automatically commence. Also due to the action of the loop 61c to 64c of Fig. 1 and to the action of the valve 70 of Fig. 2, the heating of any one of the generator-absorbers will automatically prevent the cooling of that generator-absorber.

The apparatus disclosed has many advantages. For example, it will produce continuous refrigeration, the intensity of which may be easily regulated by simply regulating the amount of heat supplied to burner. In addition the apparatus involves the use of no moving parts, consequently the apparatus will require no servicing over long periods of time.

While I have shown the cooling water as first entering the condenser at 16 and then flowing through the reservoir 60, obviously the cooling water may first flow through the cooling coil 62 and then through the condenser 15. This latter arrangement is preferable where it is desired to use a valve in the cooling water supply line responsive to the temperature of the cooling water leaving the condenser.

While the form of embodiment of the invention as herein disclosed, constitutes a preferred form, it is to be understood that other forms might be adopted, all coming within the scope of the claims which follow.

What is claimed is as follows:

1. In refrigerating apparatus, a plurality of generator-absorbers, means for heating said generator-absorbers, means for cooling said generator-absorbers, automatic means responsive to a condition of said heating means for discontinuing the heating of one generator-absorber and for starting the heating of a second generator-absorber, means automatically operative upon the heating of one of said generator-absorbers to discontinue the cooling of said one generator-absorber, said generator-absorbers being so arranged that a plurality thereof are being cooled while another one thereof is being heated.

2. Refrigerating apparatus of the absorption type comprising a plurality of generator-absorbers, means for heating said generator-absorbers comprising a closed fluid circuit, means for cooling said generator-absorbers, automatic means responsive to a condition within said heating circuit for discontinuing the heating of one generator-absorber and for starting the heating of a second generator-absorber and means automatically operative upon the heating of one of said generator-absorbers to discontinue the cooling of said one of said generator-absorbers.

3. Refrigerating apparatus comprising a plurality of generator-absorbers, means for heating said generator-absorbers including a closed fluid circuit, means for cooling said generator-absorbers, automatic means responsive to a condition within said heating circuit for discontinuing the heating of one of said generator-absorbers and for starting the heating of the other generator-absorber, said cooling means comprising a closed fluid circuit having portions in heat exchange relation with said generator-absorbers and a connecting portion out of contact with said generator-absorbers, means for cooling said portion out of contact with said generator-absorbers and means automatically operative on the heating of one of said generator-absorbers to discontinue the cooling of one of said generator-absorbers.

WILLIAM R. HAINSWORTH.